United States Patent [19]
Heroux

[11] Patent Number: 5,459,934
[45] Date of Patent: Oct. 24, 1995

[54] SIGHT ROD LEVEL

[76] Inventor: Lionel G. Heroux, 1711 SW. 95th Ter., Miramar, Fla. 33025

[21] Appl. No.: 304,117
[22] Filed: Sep. 12, 1994
[51] Int. Cl.⁶ .............................. G01C 9/28; G01C 9/36; G01C 15/08
[52] U.S. Cl. ................................ 33/373; 33/295; 33/371
[58] Field of Search .......................... 33/370, 295, 371, 33/372, 373

[56] References Cited

U.S. PATENT DOCUMENTS

| | | | |
|---|---|---|---|
| 2,096,638 | 10/1937 | Higgins, Jr. | 33/290 |
| 3,057,250 | 10/1962 | Griffith | 33/372 |
| 4,290,207 | 9/1981 | Browning et al. | 33/295 |
| 4,343,093 | 8/1982 | Eadens | 33/373 |
| 4,785,544 | 11/1988 | Heinsius | 33/334 |
| 4,879,816 | 11/1989 | Sierk | 33/295 |
| 4,908,949 | 3/1990 | Jaccard | 33/334 |
| 4,976,040 | 12/1990 | Mish et al. | 33/372 |
| 5,207,004 | 5/1993 | Gruetzmacher | 33/373 |
| 5,309,644 | 5/1994 | Robinson et al. | 33/293 |

FOREIGN PATENT DOCUMENTS 114510  4/1926  Switzerland .............................. 33/372

Primary Examiner—Christopher W. Fulton
Attorney, Agent, or Firm—Alvin S. Blum

[57] ABSTRACT

A circular target type bubble level slides easily onto and off of a standard surveyor's sight rod. When slid into position at any desired elevation on the rod for optimal viewing and released, the device automatically assumes a position such that the indicating plane of the level is exactly at right angles to the long axis of the rod. When the rod is adjusted so that the bubble level indicates the true horizontal, then the rod will be plumb. The rod is received in a through hole of a rod-encircling member. A spring bias element within the hole is forced against the rod. This forces a diametrically opposed support wall portion of the member against the rod with sufficient force to hold the level at any position on the rod without operator adjustment. It also automatically positions the indicating plane of the level orthogonal to the long axis of the rod, because the bubble level element is rigidly mounted with the desired orientation relative to the support wall portion forced against the rod.

12 Claims, 1 Drawing Sheet

SIGHT ROD LEVEL

BACKGROUND OF THE INVENTION

This invention relates to surveying instruments and more particularly to a spirit level for easy attachment to the sight rod used by surveyors to ensure their true vertical, or plumb, position.

On May 10, 1994, U.S. Pat. No. 5,309,644 issued to the applicant and a co-inventor. In that patent apparatus for measuring sewer invert elevation is disclosed. This apparatus includes a conventional surveyor's sight rod which must be held in a true vertical, or plumb, position during measurement. A circular spirit level is clamped on the rod for this purpose, employing a sleeve with a set screw for the purpose. To ensure proper positioning of the level at right angles to the rod, the clamping screw must be tightened securely. This may result in marring the rod surface, thereby making it difficult to slide the level off and onto the rod. If the level is not at the optimal height for viewing, the screw must be released before the level can be readjusted, then tightened at the desired position.

U.S. Pat. No. 4,343,093 issued Aug. 10, 1982 to Eadens discloses a circular spirit level with a pair of right angle arms for engaging a rectangular object to be plumbed, with a spring biased bead chain for wrapping about the object for attachment thereto.

U.S. Pat. No. 4,785,544 issued Nov. 22, 1988 to Heinsius et al. discloses a spirit level held to a drill by a clamp with a gap.

U.S. Pat. No. 4,908,949 issued Mar. 20, 1990 to Jaccard discloses a similar clamp with a gap.

These would not satisfy the precision requirements of the surveyor. U.S. Pat. No. 4,879,816 issued Nov. 14, 1989 to Sierk teaches a spirit level intended for attachment to a surveyer's sight rod by attachment at the screw joint between segments of the rod. It is not easily slipped on and off and cannot be adjusted to any convenient vertical position between joints.

SUMMARY OF THE INVENTION

It is accordingly an object of the invention to provide a circular spirit level for ready attachment and detachment to a surveyor's sight rod which will accurately indicate when the rod is at a true vertical, or plumb, position relative to the earth's gravitational field. It is another object that the attachment be harmless to the rod. It is yet another object that the accuracy of the device be independent of the manner in which the operator attaches the device, i.e. the device is automatically held in place with the plane of the spirit level at a true right angle to the axis of the rod.

The device of the invention comprises a circular spirit level held in a rigid mounting. The rigid mounting includes a vertical through aperture having dimensions greater than the rod diameter, including spring bias means for forcing the rod against the aperture wall. The wall at the contact with the rod is exactly at a right angle to the plane of the level. This ensures that when the level is positioned at the true horizontal, the rod will be at the true vertical or plumb position. The spring bias is such that the device may be simply slipped onto the rod to the desired elevation for convenient viewing, and released. The device will automatically remain in place and position the level plane at right angles to the rod without operator intervention.

These and other objects, advantages and features of the invention will become more apparent when the detailed description is studied in conjunction with the drawings.

DETAILED DESCRIPTION OF PREFERRED EMBODIMENTS

Figure 1:
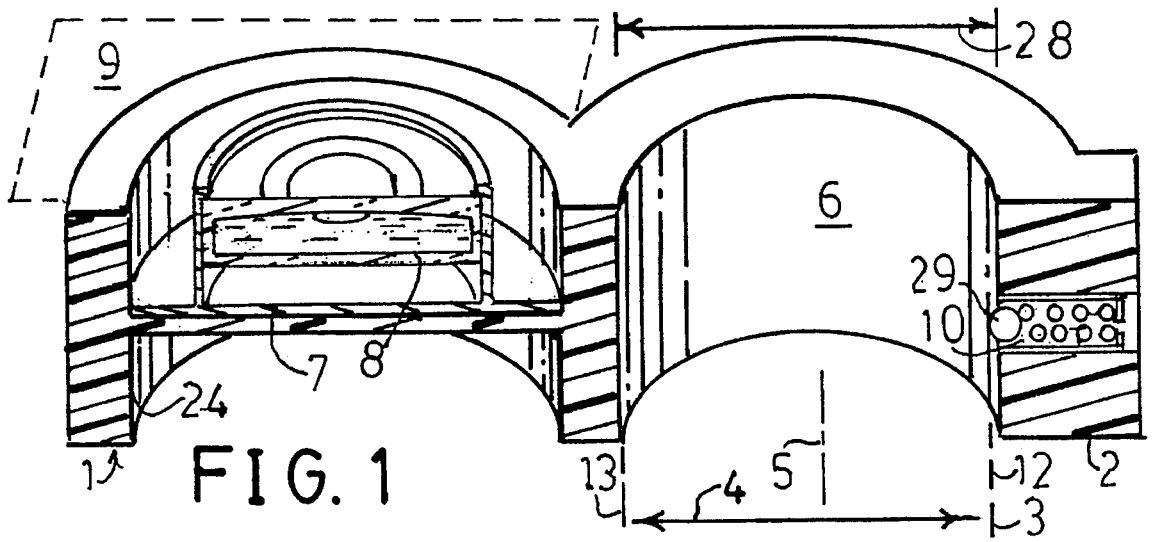
FIG. 1 is a perspective view, partially cut away, of a level of the invention.

Referring now first to FIG. 1, a standard surveyor's sight rod 3 has a uniform diameter 4 of 2.794 centimeters and a perfectly straight long axis 5.

In order to make accurate elevation measurements, the rod must be held plumb, i.e. perfectly vertical relative to the earth's gravitational field. To do this with great precision and minimal effort, the level 1 of the invention is simply slipped onto the rod and released. The rod is received in the inner space 6 of the rod-encircling member 2. The diameter 28 of this space is larger than the rod diameter by about 0.02 centimeters so that the rod is a loose, sliding fit until it encounters the spring-loaded ball plunger 10, of the type well known in the art. This one has a polyacetal ball 29 with a diameter of 0.3175 centimeter and a spring force between 0.9 and 1.8 kilograms. This ball presses against first rod surface 12, causing the diametrally opposed support wall portion 14 of member 2 tightly against the second surface 13 of the rod. This support portion is fabricated with a special relationship to the target type circular level assembly 7 held rigidly in level support 24. The level assembly 7 has a bubble vial 8 with an indicating plane 9 which will be exactly horizontal when the bubble is centered in the target. This level assembly 7 is well known in the art and is exemplified by Model #2198A86 supplied by McMaster-Carr Supply Co., Chicago, Ill. The level assembly indicating plane 9 is exactly at right angles to support portion 14 of the inner wall that is forced against the rod. Consequently the long axis 5 of the rod will be at right angles to the indicating plane 9. When the rod is adjusted so that the level indicates that the plane is horizontal, the rod will be plumb. When the measurement is completed, the device 1 may be slipped off the rod with one hand and put in a pocket for safekeeping. There is no need to tighten or adjust the device on the rod, it automatically assumes the correct orientation and has enough tension to hold itself in place. The operator may slide it up or down on the rod for optimum viewing.

Because of its automatic correct orientation, the operator's skill is not required for correct operation. Being more fragile than the rods, it is useful to be able to remove it so easily to avoid damage or theft in transport or storage. The plastic ball 29 with preset tension prevents damage to the rods.

Figure 2:
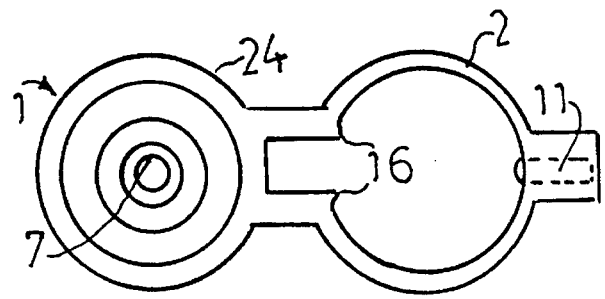
FIG. 2 is a top view of another embodiment of the invention.

Referring now to FIG. 2, an alternative embodiment is shown in which a pair of inwardly directed projections 16 form the support portion of the inner wall of the rod-encircling member 2 which is forced against the rod by the spring plunger 11.

Figure 3:
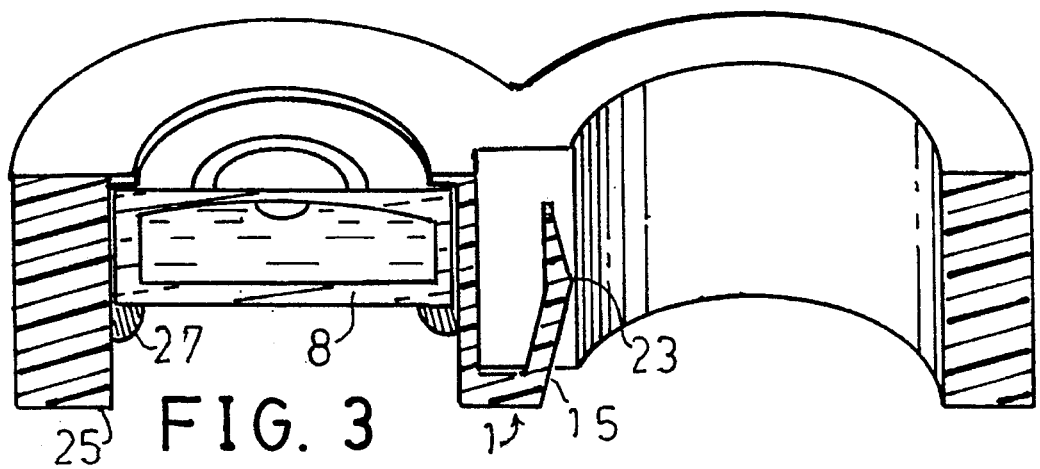
FIG. 3 is a perspective view, partially cut away, of another embodiment of the invention.

FIG. 3 shows another embodiment of the invention in which an integrally molded spring member 15 is provided to force rounded projection 23 against the rod. The glass circular bubble level vial 8 is cemented directly in housing 25 by adhesive 27.

Figure 4:
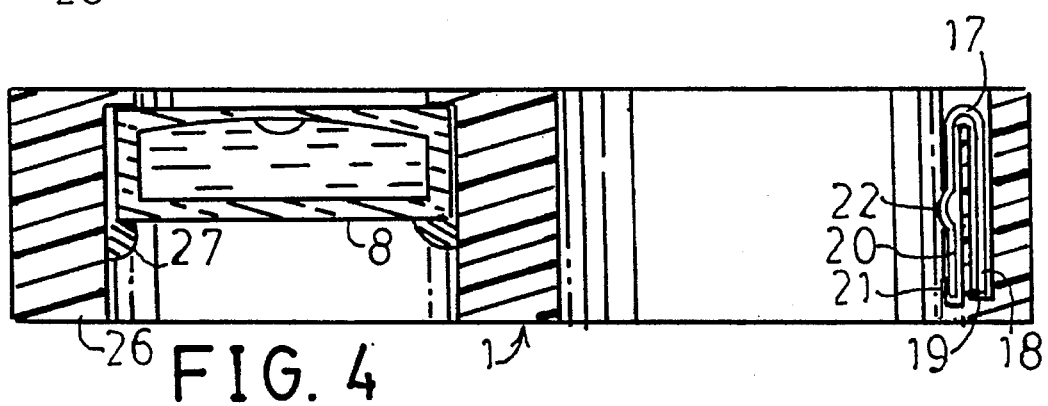
FIG. 4 is a sectional side elevation view of another embodiment of the invention.

FIG. 4 shows another embodiment of the invention in which the vial is cemented into housing 26 and the spring bias is provided by a wire spring 17 having contact projection 22 on a movable leg 20 and a fixed leg 18 cemented into hole 19. Molded-in bar 21 enables the spring 17 to be held in partial compression prior to rod insertion. The spring wire may be round or flat strip, metal or plastic, as desired.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

I claim:

1. A level for releasable attachment to a sight rod, said sight rod having a long axis and a maximum transverse dimension, the level comprising:

A) a rigid rod-encircling member having fixed inner walls defining an inner space having an open top and bottom and transverse dimensions great enough so that said space may loosely and slidably receive said rod therein;

B) a target type spirit level means for indicating displacement of an operating plane from a horizontal orientation, said spirit level means rigidly attached to said rod encircling member; and C) spring bias means attached to said rod-encircling member, said spring bias means arranged to apply a non-marring, self-supporting radially directed force to a sight rod within said inner space at a first surface of said rod to force a diametrally opposed support portion of said inner wall against a diametrally opposed second surface of said rod, said second surface of said rod being parallel to said long axis, said support portion arranged to support said operating plane at a right angle to said second surface of said rod, whereby said long axis of said rod will be vertical when said level is attached thereto and said level indicates a horizontal orientation.

2. The level according to claim 1, in which said spring bias means comprises a spring plunger extending inward from said wall.

3. The level according to claim 1, in which said spring bias means comprises a ball plunger extending inward from said wall.

4. The level according to claim 1, in which said spring bias means comprises a molded plastic spring extending inward from said wall.

5. The level according to claim 1, in which said spring bias means comprises a metal spring extending inward from said wall.

6. The level according to claim 1, in which said inner space has a substantially cylindrical configuration.

7. A level for releasable attachment to a sight rod, said sight rod having a long axis and a maximum transverse dimension, the level comprising:

A) a rigid rod-encircling member having fixed inner walls defining an inner space having an open top and bottom and transverse dimensions great enough so that said space may loosely and slidably receive said rod therein;

B) a target type spirit level means for indicating displacement of an operating plane from a horizontal orientation, said spirit level means rigidly attached to said rod encircling member; and C) spring bias means attached to said rod-encircling member, said spring bias means arranged to apply a non-marring, self-supporting radially directed force to a sight rod within said inner space at a first surface of said rod to force a diametrally opposed support portion of said inner wall against a diametrally opposed second surface of said rod, said second surface of said rod being parallel to said long axis, said support portion supporting said level means in said operating plane at a right angle to said second surface of said rod whereby said long axis of said rod will be vertical when said level is attached thereto and said level indicates a horizontal orientation.

8. The level according to claim 7, in which said spring bias means comprises a spring plunger extending inward from said wall.

9. The level according to claim 7, in which said spring bias means comprises a ball plunger extending inward from said inner wall.

10. The level according to claim 7, in which said spring bias means comprises a molded plastic spring extending inward from said inner wall.

11. The level according to claim 7, in which said spring bias means comprises a metal spring extending inward from said inner wall.

12. The level according to claim 7, in which said inner space has a substantially cylindrical configuration.

* * * * *